M. BOYLAN.
VULCANIZER.
APPLICATION FILED NOV. 12, 1919.
1,385,518.
Patented July 26, 1921.
2 SHEETS—SHEET 1.
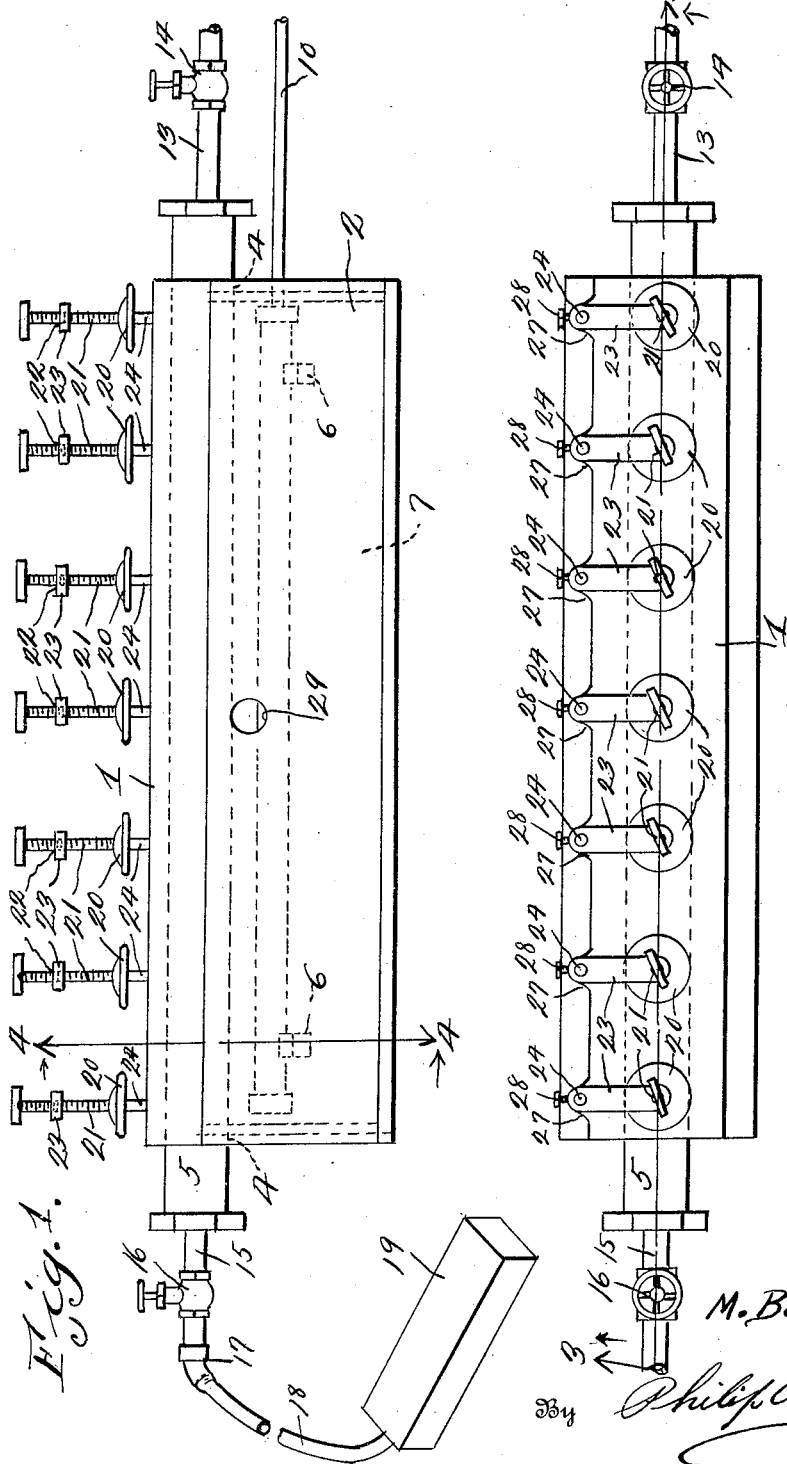
Inventor
M. Boylan
By Philip A. H. Serrell
Attorney

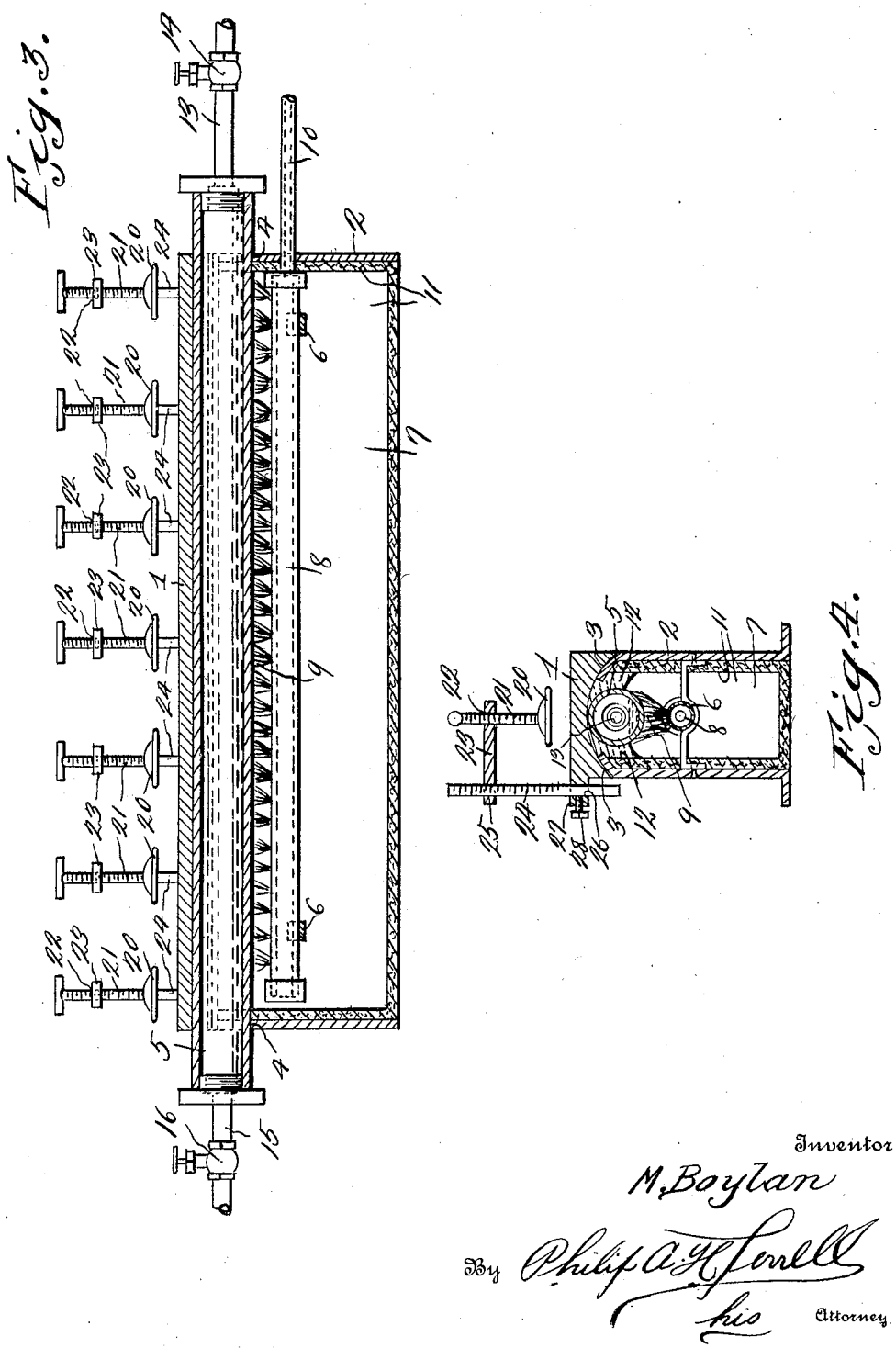

UNITED STATES PATENT OFFICE.

MICHAEL BOYLAN, OF OMAHA, NEBRASKA.

VULCANIZER.

1,385,518.  Specification of Letters Patent.  Patented July 26, 1921.

Application filed November 12, 1919. Serial No. 337,387.

*To all whom it may concern:*

Be it known that I, MICHAEL BOYLAN, a citizen of the United States, residing at Omaha, in the county of Douglas and State of Nebraska, have invented certain new and useful Improvements in Vulcanizers, of which the following is a specification, reference being had therein to the accompanying drawing.

The invention relates to vulcanizers and has for its object to provide a vulcanizer comprising an elongated plate supported on a casing in which is disposed an elongated tubular steam generating cylinder, which cylinder has disposed thereunder a gas burner for heating said steam cylinder so as to heat the vulcanizing plate disposed thereabove. One end of said steam cylinder having connected thereto a flexible pipe, to which pipe a conventional form of vulcanizing block is secured and to which block steam is admitted and controlled by a valve, said block being adapted to be clamped on a tube which is being vulcanized by means of any one of a series of jack screws carried by the elongated vulcanizing plate.

A further object is to provide a vulcanizer having a series of jack screws, whereby a series of vulcanizations may be carried on at the same time.

With the above and other objects in view the invention resides in the combination and arrangement of parts as hereinafter set forth, shown in the drawings, described and claimed, it being understood that changes in the precise embodiment of the invention may be made within the scope of what is claimed without departing from the spirit of the invention.

In the drawings:—

Figure 1 is a front elevation of the vulcanizer.

Fig. 2 is a top plan view of the vulcanizer.

Fig. 3 is a longitudinal sectional view taken on line 3—3 of Fig. 2.

Fig. 4 is a vertical sectional view taken on line 4—4 of Fig. 1.

Referring to the drawings, the numeral 1 designates an elongated vulcanizing plate, which plate is supported by a rectangular casing 2 which may be disposed on any kind of a support, such for instance as a work bench or wall bracket. Plate 1 may be braced or otherwise secured at 3 to the side walls of the casing 2. Extending longitudinally through the casing and supported in apertures 4 of the end walls thereof is a steam generating cylinder 5, in which steam is generated and the heat therefrom is radiated to the vulcanizing plate 1. Supported in brackets 6 which extend transversely through the chamber 7 of the casing 2 is a gas burner 8, the flames from which are projected against the lower side of the steam generating cylinder 5 as shown at 9, thereby heating the water in the cylinder 5 and generating steam. The gas burner is furnished with gas by means of a pipe 10 which leads to any suitable supply. The inner walls of the casing 2 are preferably lined with asbestos 11, so as to prevent the walls of the casing 2 from becoming hot which would make the casing a constant danger to the workmen working on the vulcanizer. A refractory material 12 is placed around the upper periphery of the steam generating chamber and the under surface of the vulcanizing plate 1 and forms means for holding the steam generating cylinder in place against rotation and also forms means for transmitting the heat radiated from the steam generating cylinder to the vulcanizing plate. Water is supplied to the cylinder 5 through a pipe 13 from any suitable source of supply there being a valve 14 for controlling the admission of water, said valve also forming means through which steam may exhaust so as to maintain the vulcanizing plate at a uniform temperature.

Secured to one end of the cylinder 5 is a pipe 15 having a valve 16 thereon. The outer end of said pipe having secured thereto as at 17, a pipe 18, which pipe in turn leads to a conventional form of vulcanizing block 19 and is adapted to convey steam from the cylinder 5 to said vulcanizing block, which block is of the conventional form. The block 19 if so desired may be used for vulcanizing a casing while it is on a wheel, by placing the patch and the vulcanizing material on the casing, then securing the vulcanizing block 19 in place over the patch by any form of binding material or by a clamp. When using the vulcanizing plate 1 the patch is placed on the inner tube and the tube at its patched point is placed under one of the plates 20 carried by one of the jack screws 21, which jack screws are threaded as at 22 in the ends of arms 23. The arms 23 being in turn threaded on vertically disposed shafts 24 as at 25. The lower ends of the shafts 24 being adjustably mounted in apertures 26 of lugs 27 carried by the rear edge of the vulcanizing plate 1 and are held in their adjusted positions by means of set screws 28. It will be seen that the shafts 24 may be adjusted upwardly as desired and that this upward adjustment may be accomplished by the rotation of the arms 23 on the threaded shafts 24. It will also be seen that by the arms 23 being threaded on the shafts 24 that the jack screws may during the placing of the tube in position on the vulcanizing plate 1 be swung out of the way. If so desired during the vulcanizing operation the tube may be placed on the plate 1, then the vulcanizing block 19 placed on top of the tube and the jack screw screwed into engagement with the vulcanizing block 19 so that said block may be utilized for vulcanizing in connection with the vulcanizing plate 1. One of the walls of the casing 2 is provided with an aperture 29, through which aperture a match may be inserted to light the burner 8.

From the above it will be seen that a vulcanizer is provided wherein the steam generated within the cylindrical member may be utilized for radiating heat to a vulcanizing plate, over which plate a series of clamps are disposed. Also that steam from the generating cylinder may be utilized for supplying heat to a vulcanizing block through a flexible pipe.

The invention having been set forth what is claimed as new and useful is:—

1. A vulcanizer comprising a vulcanizing plate, clamps carried by said vulcanizing plate for clamping an article to be vulcanized on said plate, means for vertically and horizontally adjusting said clamps, a casing for supporting said vulcanizing plate, a steam generating cylinder disposed within the casing and adjacent the under face of the vulcanizing plate, a burner within the casing and disposed below the steam generating cylinder and a pipe connected to one end of the steam generating cylinder, said pipe having connected to its other end a vulcanizing block.

2. A vulcanizer comprising a vulcanizing plate having its under face convexed, a series of vertically and horizontally adjustable clamps carried by one of the marginal edges of the vulcanizing plate, a casing for supporting said vulcanizing plate and engaging the sides of the concaved portion thereof, a steam generating cylinder disposed within the casing and engaging the under face of the vulcanizing plate, refractory material surrounding the upper periphery of the steam generating cylinder and engaging the under face of the vulcanizing plate, an elongated burner disposed below the generating cylinder and within the casing, and a flexible pipe connected to one end of the steam generating cylinder and having its other end connected to a vulcanizing block.

3. A vulcanizer comprising a vulcanizing plate having its inner face concaved, a series of clamps carried by one of the marginal edges of the vulcanizing plate, said clamps comprising vertically adjustable threaded shafts having horizontally pivoted arms threaded thereon, jack screws threaded in the free ends of said arms and being adapted to clamp an article on the vulcanizing plate, a cylindrical steam generating cylinder disposed below the vulcanizing plate and within a supporting case, an elongated burner disposed below said steam generating cylinder and within the casing, and means for supplying water to the generating cylinder and allowing the exhaust of steam as desired, and means whereby access may be had to the burner in the casing for lighting purposes, said means also forming means for supplying additional air to the burner.

In testimony whereof I hereunto affix my signature.

MICHAEL BOYLAN.